Dec. 25, 1951 F. C. ALBRIGHT 2,580,064
FLUID PRESSURE OPERATED STEERING DEVICE
Filed Jan. 27, 1950 3 Sheets-Sheet 1

INVENTOR.
FRANKLIN C ALBRIGHT
BY
ATTORNEY

Dec. 25, 1951  F. C. ALBRIGHT  2,580,064
FLUID PRESSURE OPERATED STEERING DEVICE

Filed Jan. 27, 1950  3 Sheets-Sheet 2

INVENTOR.
FRANKLIN C. ALBRIGHT
BY
*T. J. Plante*
ATTORNEY

Dec. 25, 1951  F. C. ALBRIGHT  2,580,064
FLUID PRESSURE OPERATED STEERING DEVICE
Filed Jan. 27, 1950  3 Sheets-Sheet 3
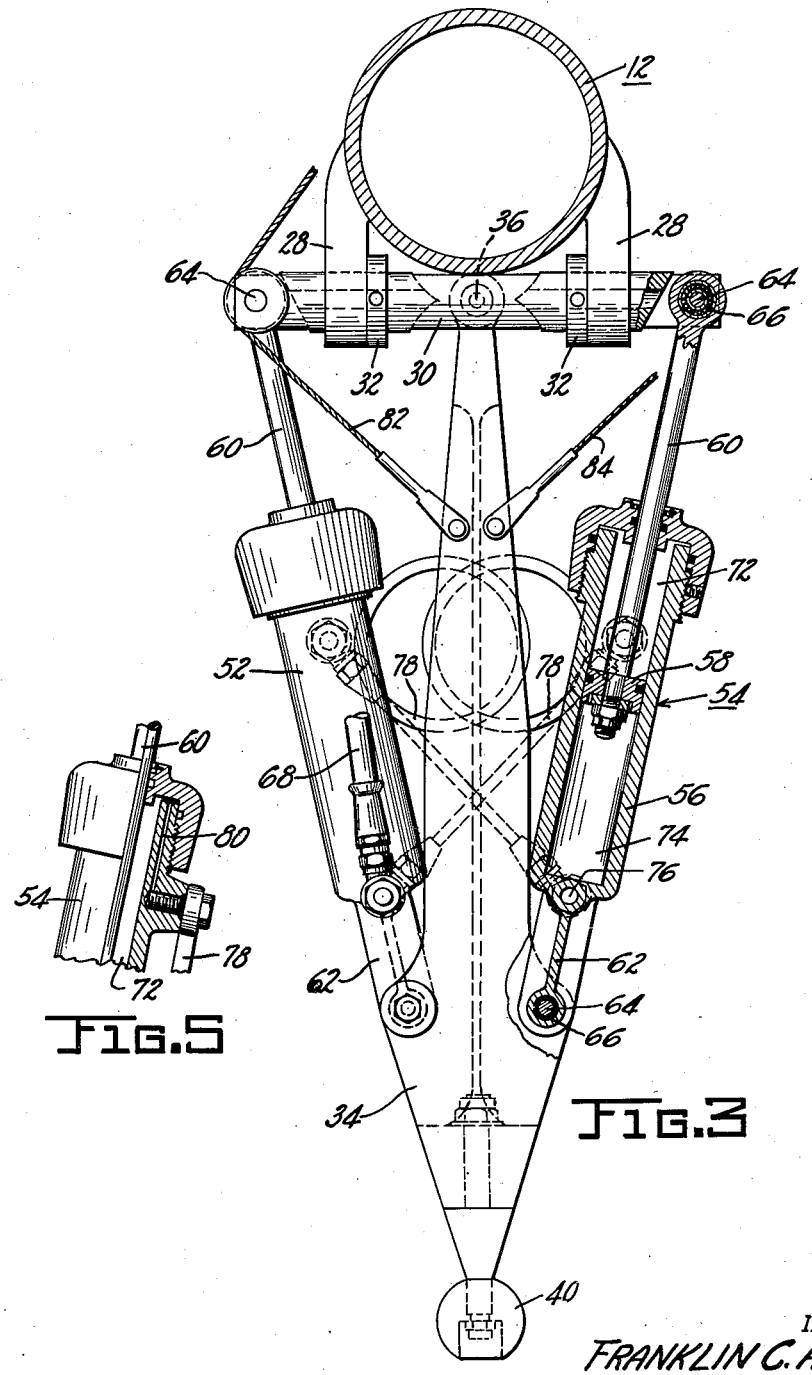
INVENTOR.
FRANKLIN C. ALBRIGHT
BY
T. J. Plante
ATTORNEY Patented Dec. 25, 1951

2,580,064

UNITED STATES PATENT OFFICE 2,580,064

FLUID PRESSURE OPERATED STEERING DEVICE

Franklin C. Albright, South Bend, Ind., assignor to Bendix Aviation Corporation, South Bend, Ind., a corporation of Delaware Application January 27, 1950, Serial No. 140,935

19 Claims. (Cl. 244—50)

1

This invention relates to an improved fluid pressure operated steering device intended primarily for use in conjunction with aircraft landing gear, but usable also as a power steering installation on other vehicles, such as buses and trucks.

Among the advantages of the steering device disclosed herein over previously suggested arrangements are the following: (1) more direct application of steering torque to the ground-engaging member; (2) simplification and consequent reduction of manufacturing cost; and (3) reduced weight (a particularly important consideration in the case of aircraft components).

In general, my improved steering device comprises a torque link connected to either the steerable element or the non-steerable element, a member which connects the outer end of the torque link to the other element, and one or more hydraulic motors each of which is mounted at an angle to said member in order to exert a steering force on it at a point near its connection with the torque link.

The following description relates to an illustrative embodiment of the invention in a nose wheel landing gear. In the accompanying drawings, which are used in conjunction with the written description:

Figure 1:
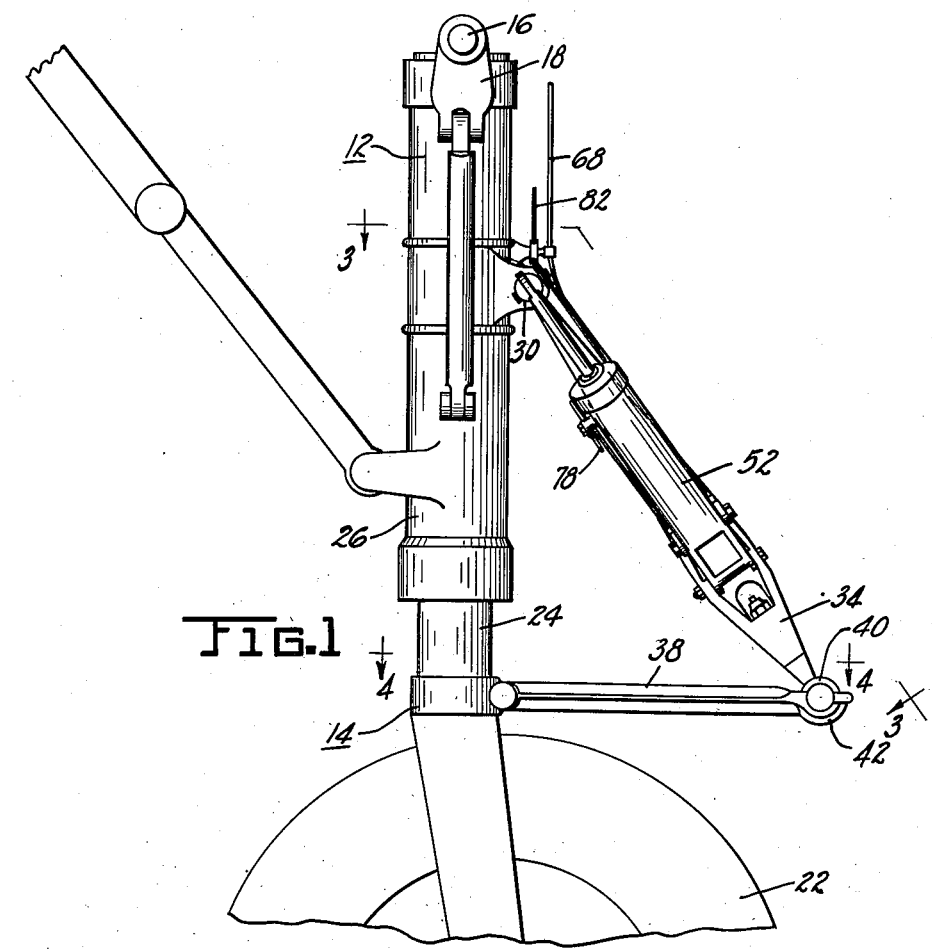
Figure 1 is a side elevation of a nose wheel landing gear which includes my improved steering device.
Figure 4:
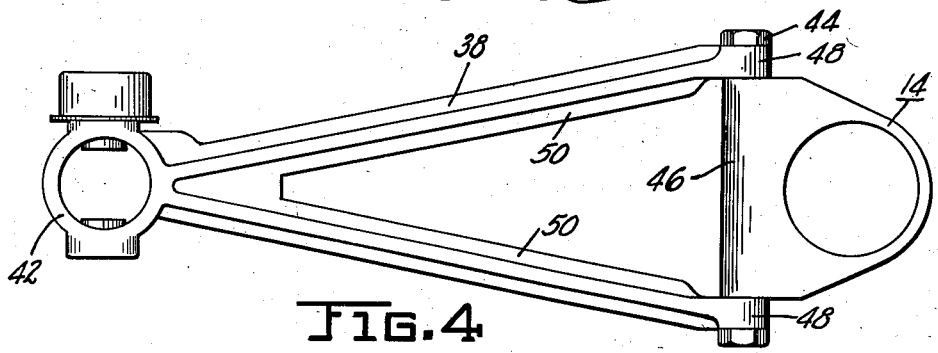

Figures 3 and 4 are enlarged views taken on the lines 3—3 and 4—4 of Figure 1, showing the steering unit and the torque link, respectively; and Figure 5 is a sectional view taken on the line 5—5 of Figure 3.

Figure 2:
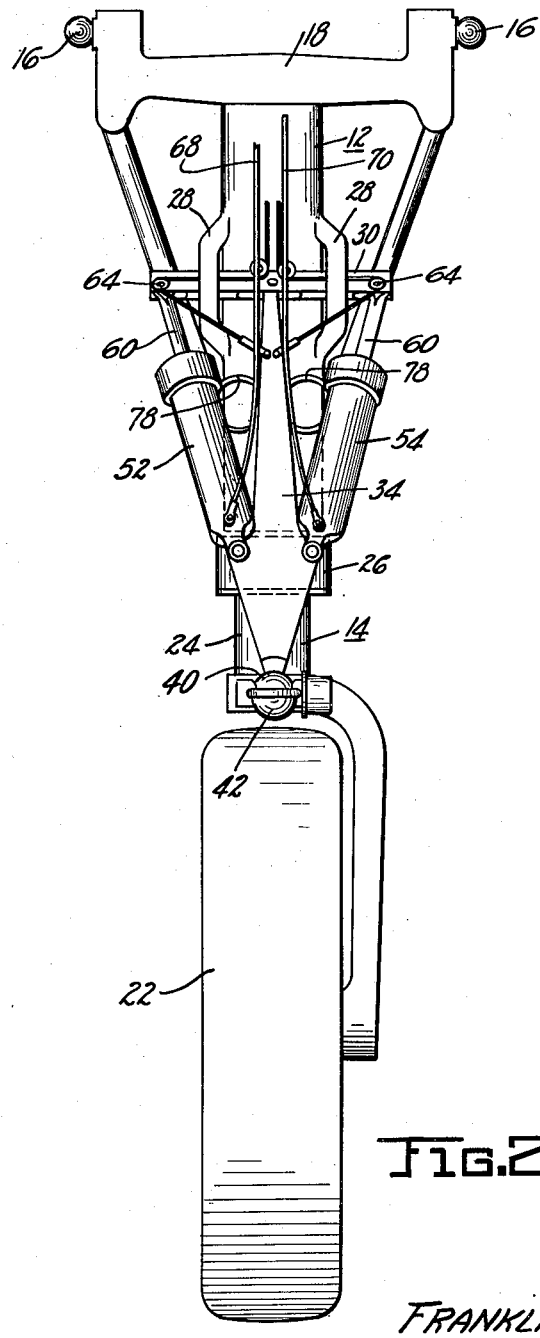
Figure 2 is a front elevation of the landing gear of Figure 1.

As shown in Figures 1 and 2, the landing gear includes an upper landing gear element 12 which is connected to the body of the aircraft, and a lower ground-engaging landing gear element 14. In order to permit retraction of the landing gear, the upper element 12 may be pivotally mounted on the body of the aircraft by means of ball-shaped extensions 16 formed on the laterally-extending bar 18, pivotal retracting movement of the landing gear being brought about by suitable linkage. The lower landing gear element 14 includes a ground-engaging member, such as wheel 22, and a tubular upper portion 24 which is telescopically received in the tubular portion 26 of the upper landing gear element. The telescopically connected members 24 and 26 are internally

2 constructed and arranged to act as a shock-absorbing strut, in the conventional manner.

It is customary to provide telescoping shock struts with devices referred to either as "torque links" or "scissors." Devices of this type permit telescoping action of the shock strut while preventing rotation of the lower element relative to the upper element. Fluid pressure operated steering devices heretofore suggested for landing gear installations have usually consisted of units mounted on the upper element of the shock strut and arranged to rotate a collar which transmits torque through the upper and lower torque links to the lower element of the shock strut.

The illustrated embodiment of my steering arrangement provides, in effect, for the substitution of a fluid pressure steering device for the upper torque link. Preferably, the steering device which is substituted for the upper torque link includes a stabilizer strut and two hydraulic motors arranged to act on the stabilizer strut near its connection with the lower torque link.

As shown in the drawings, the upper landing gear element 12 has two spaced lugs 28, which act as supporting bearings for a trunnion 30. The trunnion 30 is therefore rotatable on a horizontal axis, and is prevented from sliding axially by suitable means, such as collars 32 (see Figure 3).

One end of a stabilizer strut 34 is pivotally mounted on a pivot pin 36 carried by the trunnion. The pivot pin 36 is located at the center of the trunnion and its axis is at right angles to the axis of the trunnion. The outer end of the stabilizer strut is able to move either vertically or laterally (or a combination of vertically and laterally) with respect to the upper landing gear element 12. Although the trunnion and pivot pin construction provides a particularly satisfactory connection between the stabilizer strut and the upper landing gear element, any connection may be used which retains the inner end of the stabilizer strut in position, while permitting vertical and/or lateral movements of the outer end of the stabilizer strut. For example, a ball-and-socket joint would provide a satisfactory connection between the stabilizer strut and the upper landing gear element.

The stabilizer strut 34 extends outwardly and downwardly from its pivotal connection with the trunnion, and the lower end of the stabilizer strut is connected by a ball-and-socket joint to the outer end of a torque link 38. The inner end of torque link 38 is pivotally connected to the lower landing gear element 14 to permit angular movement in a vertical plane of the torque link with respect to the lower landing gear element while constraining the latter to rotate about its axis in response to steering force exerted through the torque link. The ball-and-socket connection between stabilizer strut 34 and torque link 38 may consist of a ball member 40 secured to the end of the stabilizer strut, and a socket 42 provided on the end of the torque link. The pivotal connection between the inner end of the torque link and the lower landing gear element may be provided by the construction shown in Figure 4, consisting of a pivot bolt 44 which is carried by a wide lug 46 formed on the lower landing gear element and which extends through openings provided in lugs 48 formed on the ends of torque link forks 50.

The ball-and-socket joint 40—42 connects the stabilizer strut and the torque link in such a way that lateral movement of the outer end of the stabilizer strut causes the torque link and lower landing gear element to rotate about the vertical axis of the landing gear. At the same time, both the telescoping action of the landing gear and the angular motion of the stabilizer strut with respect to the torque link are accommodated by the joint. Any joint which provides the same functions may be used in place of the ball-and-socket joint.

The steering force required to turn the lower landing gear element is exerted on the stabilizer strut by means of two hydraulic motors 52 and 54, each of which comprises a cylinder 56 and a piston 58 reciprocable in the cylinder. (The interior construction of the hydraulic motors, which are preferably identical, is shown in the sectional views of one of the motors in Figures 3 and 5.) Each piston 58 is secured to a rod 60, which is pivotally connected to trunnion 30 near one end of the trunnion. Each cylinder 56 has an extension 62 which is pivotally connected to the stabilizer strut near the outer (i. e. lower) end of the stabilizer strut. Both the piston rods 60 and the cylinder extensions 62 are pivotally mounted on pivot pins 64, the axes of which are parallel to the axis of pivot pin 36. In order to minimize friction, all of the pivotal bearing points 64, and the bearing point 36, may have needle bearings 66.

The piston rod of motor 52 is connected to the left end of the trunnion, and the piston rod of motor 54 is connected to the right end of the trunnion. Owing to the diverging angles between the axes of the motors and the stabilizer strut, pressure developed inside the motors tending to collapse one and extend the other has a tendency to rotate the stabilizer strut about the vertical axis of the landing gear, exerting a tangential force at the ball-and-socket joint 40—42.

Obviously, the position of each cylinder and piston may be reversed, if desired. In other words, the cylinder may be pivotally connected to the trunnion, and the piston pivotally connected to the stabilizer strut. Furthermore, ball-and-socket connections can be used to connect the hydraulic motors to the upper landing gear element, provided such connections are spaced sufficiently from the center of the landing gear to enable the hydraulic motors to develop the required steering torque.

As shown in Figure 2, two control conduits 68 and 70 connect the hydraulic motors to the control valve (not shown). The control valve may be located either on the landing gear or in some relatively remote place in the aircraft. In the illustrative embodiment of the invention, it is assumed that the control valve is mounted in the body of the aircraft. Control line 68 communicates with the outer (i. e. lower) chamber of motor 52 and with the inner (i. e. upper) chamber 72 of motor 54. Control line 70 communicates with the outer chamber 74 of motor 54 and with the inner chamber of motor 52. Each control line is connected to the outer chamber 74 of the respective motor through a lateral passage 76 and an intersecting passage (not shown). Intercommunication between the opposite ends of opposite motors is provided by conduits 78, which are each looped, as shown, to absorb slight changes in the distance between the ends of the conduit as the steering unit moves in either direction. The inner chamber 72 of each motor communicates with the respective conduit 78 through a passage 80 (see Figure 5).

Operation of my improved steering device is as follows. When the control valve (which may be of conventional construction) is operated to connect control line 68 to the pressure source and control line 70 to the no-pressure reservoir, fluid under pressure will enter the outer chamber of motor 52 and the inner chamber of motor 54, thereby simultaneously tending to extend motor 52 and to shorten motor 54. The total force of the two motors thus develops a counterclockwise (as shown in Figure 3) turning torque of the stabilizer strut, torque link, and lower landing gear element about the vertical axis of the landing gear.

When the control valve is operated to connect control line 70 to the pressure source and control line 68 to the no-pressure reservoir, fluid under pressure will enter the outer chamber of motor 54 and the inner chamber of motor 52, thereby simultaneously tending to extend motor 54 and to shorten motor 52. The total force of the two thus develops a clockwise turning torque of the stabilizer strut, torque link, and lower landing gear element about the vertical axis of the landing gear.

In order to provide follow-up control of the steering device, two follow-up cables 82 and 84 may be used. By connecting the cables to the stabilizer strut, as shown, and to the body of the control valve, the control valve casing can be caused to follow the valve element as the stabilizer strut turns, bringing the valve to lapped position after the selected amount of angular steering movement has been obtained.

Preferably, the torque link 38 is substantially perpendicular to the axis of the landing gear in the normal ground-engaging, i. e. taxiing, position of the landing gear. With this arrangement, the steering force exerted by the stabilizer strut on the torque link has the maximum moment arm, and therefore the maximum steering torque. Throughout operation of the steering device, the landing gear is free for normal vertical deflections, and the magnitude of the torque exerted by the motors varies only slightly near the static, or normal, position. As the landing gear extends, the torque is reduced, but the required turning torque is also reduced.

The steering device also functions as a "shimmy dampener" to limit torsional vibrations of the lower landing gear element. When the steering device is not being operated for steering, the wheel 22 is permitted castering action. In castering, the wheel must cause fluid to be moved through the conduits 78. By making the diameter of passage 80 sufficiently small, as shown, the flow of fluid can be restricted sufficiently to dampen any tendency of the wheel to shimmy. This location of the restricting passage limits the rate of turning during steering, but this feature is considered desirable, since it avoids excessively sharp turns. Where the control valve is supported on the landing gear, combined castering and shimmy dampening effect may be obtained by providing the valve element with a restricting passage which interconnects the motors 52 and 54 when the valve is in neutral position.

The steering device (consisting of the stabilizer strut and the two motors) may be substituted for the lower torque link, if preferred, using a conventional upper torque link. Or both torque links may be replaced by steering devices of this type, thereby increasing the angular steering travel. A single steering motor could be used, but such an arrangement would obviously be inferior to the illustrated construction.

Although the hydraulic steering motors might conceivably be used without the stabilizer strut, the latter is considered necessary in most, if not all, installations, because the differential between the effective areas of the upper and lower faces of each piston (owing to the presence of the piston rod on one side) would permit the greater force tending to extend one motor to overcome the lesser force tending to shorten the other motor, thereby enabling both motors to reach fully extended position at the same time and render the steering device inoperative.

Although the primary usefulness of the fluid pressure operated steering device disclosed herein is in cases where the steered and fixed parts of the vehicle are telescopically connected, the device can be used in combination with a construction in which the steered and fixed parts of the vehicle are not relatively reciprocable.

Although a particular embodiment of my invention has been described, it will be understood by those skilled in the art that the objects of the invention may be attained by the use of constructions different in certain respects from that disclosed without departing from the underlying principles of the invention.

I claim:

1. A steerable aircraft landing gear comprising an upper landing gear element connected to the body of the aircraft, a lower ground-engaging landing gear element having an upper portion which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly and downwardly from its pivotal connection with the trunnion, a torque link connected at its outer end by a ball-and-socket joint to the lower end of the stabilizer strut and arranged to be substantially perpendicular to the axis of the landing gear in taxiing position, the inner end of the torque link being pivotally connected to the lower landing gear element to permit angular movement in a vertical plane of the torque link with respect to the lower landing gear element while constraining the latter to rotate about its axis in response to steering force exerted through the torque link, a first hydraulic motor comprising a cylinder and a piston reciprocable therein, one of which is pivotally connected to the trunnion near one end of the trunnion and the other of which is pivotally connected to the stabilizer strut near the lower end of the stabilizer strut, a second hydraulic motor comprising a cylinder and a piston reciprocable therein, one of which is pivotally connected to the trunnion near the other end of the trunnion and the other of which is pivotally connected to the stabilizer strut near the lower end of the stabilizer strut, both of the pivotal connections of both hydraulic motors being arranged to permit lateral movement of the motors about axes perpendicular to the axis of the trunnion, a first control conduit communicating with the inner end of the first hydraulic motor and with the outer end of the second hydraulic motor, a second control conduit communicating with the outer end of the first hydraulic motor and with the inner end of the second hydraulic motor, and restrictions in both of the control conduits arranged to limit the rate of flow of hydraulic fluid during turning of the stabilizer strut.

2. A steerable aircraft landing gear comprising an upper landing gear element connected to the body of the aircraft, a lower ground-engaging landing gear element having an upper portion which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly and downwardly from its pivotal connection with the trunnion, a torque link connected at its outer end by a ball-and-socket joint to the lower end of the stabilizer strut and arranged to be substantially perpendicular to the axis of the landing gear in taxiing position, the inner end of the torque link being pivotally connected to the lower landing gear element to permit angular movement in a vertical plane of the torque link with respect to the lower landing gear element while constraining the latter to rotate about its axis in response to steering force exerted through the torque link, a first hydraulic motor comprising a cylinder and a piston reciprocable therein, one of which is pivotally connected to the trunnion near one end of the trunnion and the other of which is pivotally connected to the stabilizer strut near the lower end of the stabilizer strut, a second hydraulic motor comprising a cylinder and a piston reciprocable therein, one of which is pivotally connected to the trunnion near the other end of the trunnion and the other of which is pivotally connected to the stabilizer strut near the lower end of the stabilizer strut, both of the pivotal connections of both hydraulic motors being arranged to permit lateral movement of the motors about axes perpendicular to the axis of the trunnion, a first control conduit communicating with the inner end of the first hydraulic motor and with the outer end of the second hydraulic motor, a second control conduit communicating with the outer end of the first hydraulic motor and with the inner end of the second hydraulic motor, and means associated with the control conduits for damping torsional vibrations of the lower landing gear element when steering force is not being exerted through the stabilizer strut.

3. A steerable aircraft landing gear comprising an upper landing gear element connected to the body of the aircraft, a lower ground-engaging landing gear element having an upper portion which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly and downwardly from its pivotal connection with the trunnion, a torque link connected at its outer end by a ball-and-socket joint to the lower end of the stabilizer strut and arranged to be substantially perpendicular to the axis of the landing gear in taxiing position, the inner end of the torque link being pivotally connected to the lower landing gear element to permit angular movement in a vertical plane of the torque link with respect to the lower landing gear element while constraining the latter to rotate about its axis in response to steering force exerted through the torque link, a first hydraulic motor comprising a cylinder and piston reciprocable therein, one of which is pivotally connected to the trunnion near one end of the trunnion and the other of which is pivotally connected to the stabilizer strut near the lower end of the stabilizer strut, a second hydraulic motor comprising a cylinder and a piston reciprocable therein, one of which is pivotally connected to the trunnion near the other end of the trunnion and the other of which is pivotally connected to the stabilizer strut near the lower end of the stabilizer strut, both of the pivotal connections of both hydraulic motors being arranged to permit lateral movement of the motors about axes perpendicular to the axis of the trunnion, a first control conduit communicating with the inner end of the first hydraulic motor and with the outer end of the second hydraulic motor, and a second control conduit communicating with the outer end of the first hydraulic motor and with the inner end of the second hydraulic motor.

4. A steerable aircraft landing gear comprising an upper landing gear element connected to the body of the aircraft, a lower ground-engaging landing gear element having an upper portion which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly from its pivotal connection with the trunnion, a torque link connected at its outer end by a ball-and-socket joint to the outer end of the stabilizer strut, the inner end of the torque link being pivotally connected to the lower landing gear element to permit angular movement in a vertical plane of the torque link with respect to the lower landing gear element while constraining the latter to rotate about its axis in response to steering force exerted through the torque link, a first hydraulic motor comprising a cylinder and a piston reciprocable therein, one of which is pivotally connected to the trunnion near one end of the trunnion and the other of which is pivotally connected to the stabilizer strut near the outer end of the stabilizer strut, a second hydraulic motor comprising a cylinder and a piston reciprocable therein, one of which is pivotally connected to the trunnion near the other end of the trunnion and the other of which is pivotally connected to the stabilizer strut near the outer end of the stabilizer strut, both of the pivotal connections of both hydraulic motors being arranged to permit lateral movement of the motors about axes perpendicular to the axis of the trunnion, a first control conduit communicating with the inner end of the first hydraulic motor and with the outer end of the second hydraulic motor, and a second control conduit communicating with the outer end of the first hydraulic motor and with the inner end of the second hydraulic motor.

5. A steerable aircraft landing gear comprising an upper landing gear element connected to the body of the aircraft, a lower ground-engaging landing gear element having an upper portion which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly from its pivotal connection with the trunnion, a torque link connected at its outer end by a ball-and-socket joint to the outer end of the stabilizer strut, the inner end of the torque link being pivotally connected to the lower landing gear element to permit angular movement in a vertical plane of the torque link with respect to the lower landing gear element while constraining the latter to rotate about its axis in response to steering force exerted through the torque link, a first hydraulic motor comprising a cylinder and a piston reciprocable therein, one of which is pivotally connected to the trunnion near one end of the trunnion, and the other of which is pivotally connected to the stabilizer strut near the outer end of the stabilizer strut, and a second hydraulic motor comprising a cylinder and a piston reciprocable therein, one of which is pivotally connected to the trunnion near the other end of the trunnion, and the other of which is pivotally connected to the stabilizer strut near the outer end of the stabilizer strut, both of the pivotal connections of both hydraulic motors being arranged to permit lateral movement of the motors about axes perpendicular to the axis of the trunnion.

6. A steerable aircraft landing gear comprising an upper landing gear element, a lower landing gear element which is telescopically connected to the upper landing gear element, a trunnion supported on the upper landing gear element in such a way as to be rotatable on a horizontal axis, a stabilizer strut, one end of which is pivotally connected to the center of the trunnion to permit lateral movement of the stabilizer strut about an axis perpendicular to the axis of the trunnion, said stabilizer strut extending outwardly from its pivotal connection with the trunnion, a torque link connected at its outer end to the outer end of the stablizer strut, the connection between the stabilizer strut and the torque link being arranged to constrain their outer ends to rotate together about the axis of the landing gear, while permitting their inner ends to have relative movement either vertically or angularly, the inner end of the torque link being pivotally connected to the lower landing gear element to permit angular movement in a vertical plane of the torque link with respect to the lower landing gear element while constraining the latter to rotate about its axis in response to steering force exerted through the torque link, a first fluid pressure motor comprising two relatively reciprocable parts, one of which is pivotally connected to the trunnion near one end of the trunnion, and the other of which is pivotally connected to the stablizer strut near the outer end of the stabilizer strut, and a second fluid pressure motor comprising two relatively reciprocable parts, one of which is pivotally connected to the trunnion near the other end of the trunnion, and the other of which is pivotally connected to the stabilizer strut near the outer end of the stablizer strut.

7. A steerable aircraft landing gear comprising an upper landing gear element, a lower landing gear element which is telescopically connected to the upper landing gear element, a stabilizer strut, the inner end of which is connected to the upper landing gear element by means of a joint which permits vertical and lateral angular movements of the outer portion of the stabilizer strut with respect to the upper landing gear element, a torque link connected at its outer end to the outer end of the stabilizer strut, the connection between the stabilizer strut and the torque link being arranged to constrain their outer ends to rotate together about the axis of the landing gear, while permitting their inner ends to have relative movement either vertically or angularly, the inner end of the torque link being pivotally connected to the lower landing gear element to permit angular movement in a vertical plane of the torque link with respect to the lower landing gear element while constraining the latter to rotate about its axis in response to steering force exerted through the torque link, a first fluid pressure motor comprising two relatively reciprocable parts, one of which is connected to the upper landing gear element at a point spaced laterally in one direction from the inner end of the stabilizer strut, and the other of which is connected to the stabilizer strut near the outer end of the stabilizer strut, and a second fluid pressure motor comprising two relatively reciprocable parts, one of which is connected to the upper landing gear element at a point spaced laterally in the opposite direction from the inner end of the stabilizer strut, and the other of which is connected to the stablizer strut near the outer end of the stabilizer strut.

8. A steerable aircraft landing gear comprising an upper landing gear element, a lower landing gear element, a stabilizer strut, the inner end of which is connected to one of the landing gear elements, a torque link connected at its outer end to the outer end of the stabilizer strut, the inner end of the torque link being connected to the other landing gear element, a first fluid pressure motor comprising two relatively reciprocable parts, one of which is connected to the landing gear element to which the stabilizer strut is connected at a point spaced laterally in one direction from the inner end of the stabilizer strut, and the other of which is connected to the stabilizer strut near the outer end of the stabilizer strut, and a second fluid pressure motor comprising two relatively reciprocable parts, one of which is connected to the landing gear element to which the stabilizer strut is connected at a point spaced laterally in the opposite direction from the inner end of the stabilizer strut, and the other of which is connected to the stabilizer strut near the outer end of the stabilizer strut.

9. A steerable aircraft landing gear comprising an upper landing gear element, a lower landing gear element, a stabilizer strut, the inner end of which is connected to one of the landing gear elements, a torque link connected at its outer end to the outer end of the stablizer strut and at its inner end to the other landing gear element, and a fluid pressure motor comprising two relatively reciprocable parts, one of which is connected to the landing gear element to which the stabilizer strut is connected at a point spaced laterally from the inner end of the stabilizer strut, and the other of which is connected to the stabilizer strut near the outer end of the stabilizer strut.

10. A steerable aircraft landing gear comprising two landing gear elements, one of which is rotatable about the landing gear axis, a strut connected at its inner end to one of the landing gear elements, a link connected at its outer end to the outer end of the strut and at its inner end to the other landing gear element, and a fluid pressure motor comprising two relatively reciprocable parts, one of which is connected to the landing gear element to which the strut is connected at a point spaced laterally from the inner end of the strut, and the other of which is connected to the strut to exert a turning force thereon.

11. A fluid pressure operated steering device, for use on a vehicle having a non-steerable element and a steerable element telescopically connected to the non-steerable element, comprising a stabilizer strut, the inner end of which is connected to the non-steerable element by means of a joint which permits vertical and lateral angular movements of the outer portion of the stabilizer strut with respect to the non-steerable element, a torque link connected at its outer end to the end of the stabilizer strut, the connection between the stabilizer strut and the torque link being arranged to constrain their outer ends to rotate together about the steering axis, while permitting their inner ends to have relative movement either vertically or angularly, the inner end of the torque link being pivotally connected to the steerable element to permit angular movement in a vertical plane of the torque link with respect to the steerable element while constraining the latter to rotate about its axis in response to steering force exerted through the torque link, a first fluid pressure motor comprising two relatively reciprocable parts, one of which is connected to the non-steerable element at a point spaced laterally in one direction from the inner end of the stabilizer strut, and the other of which is connected to the stabilizer strut near the outer end of the stabilizer strut, and a second fluid pressure motor comprising two relatively reciprocable parts, one of which is connected to the non-steerable element at a point spaced laterally in the opposite direction from the inner end of the stabilizer strut, and the other of which is connected to the stabilizer strut near the outer end of the stabilizer strut.

12. A fluid pressure operated steering device, for use on a vehicle having a first element connected to the body of the vehicle and a second element associated with said first element and rotatable with respect thereto, comprising a stabilizer strut, the inner end of which is connected to one of said elements, a torque link connected at its outer end to the outer end of the stabilizer strut, the inner end of the torque link being connected to the other element, a first fluid pressure motor comprising two relatively reciprocable parts, one of which is connected to the element to which the stabilizer strut is connected at a point spaced laterally in one direction from the inner end of the stabilizer strut, and the other of which is connected to the stabilizer strut near the outer end of the stabilizer strut, and a second fluid pressure motor comprising two relatively reciprocable parts, one of which is connected to the element to which the stabilizer strut is connected at a point spaced laterally in the opposite direction from the inner end of the stabilizer strut, and the other of which is connected to the stabilizer strut near the outer end of the stabilizer strut.

13. A fluid pressure operated steering device, for use on a vehicle having a first element connected to the body of the vehicle and a second element associated with said first element and rotatable with respect thereto, comprising a strut connected at its inner end to one of said elements, a link connected at its outer end to the outer end of the strut and at its inner end to the other element, and a fluid pressure motor comprising two relatively reciprocable parts, one of which is connected to the element to which the strut is connected at a point spaced laterally from the inner end of the strut, and the other of which is connected to the strut to exert a turning force thereon.

14. A steerable aircraft landing gear comprising two telescopically associated landing gear elements, a strut connected at one of its ends to one of said elements, a link connected between the other end of said strut and the other element, and a fluid pressure motor capable of extending and contracting in length having one of its ends connected to the end of said strut near the link connection and its other end connected to the first mentioned element at a point spaced laterally from the first mentioned connection between said strut and said first mentioned element whereby the extension or contraction of said motor will exert a lateral turning force on said strut.

15. A fluid pressure operated steering device, for use on a vehicle having a non-steerable element and a steerable element telescopically connected to the non-steerable element, comprising a stabilizer strut, the inner end of which is connected to the non-steerable element by means of a joint which permits vertical and lateral angular movements of the outer portion of the stabilizer strut with respect to the non-steerable element, a torque link connected at its outer end to the end of the stabilizer strut, the connection between the stabilizer strut and the torque link being arranged to constrain their outer ends to rotate together about the steering axis, while permitting their inner ends to have relative movement either vertically or angularly, the inner end of the torque link being pivotally connected to the steerable element to permit angular movement in a vertical plane of the torque link with respect to the steerable element while constraining the latter to rotate about its axis in response to steering force exerted through the torque link, a first motor device capable of extending and contracting in length having one end connected to the non-steerable element at a point spaced laterally in one direction from the inner end of the stabilizer strut and the other end connected to the stabilizer strut near the outer end thereof, and a second motor device also capable of extending and contracting in length having one end connected to the non-steerable element at a point spaced laterally in the opposite direction from the inner end of the stabilizer strut and the other end connected to the stabilizer strut near the outer end thereof, said motor devices when actuated exerting a turning force on said strut for steering said steerable element.

16. A fluid pressure operated steering device, for use on a vehicle, having a non-steerable element and a steerable element telescopically connected to the non-steerable element, comprising a stabilizer strut, the inner end of which is connected to the non-steerable element by means of a joint which permits vertical and lateral angular movements of the outer portion of the stabilizer strut with respect to the non-steerable element, a torque link connected at its outer end to the end of the stabilizer strut, the connection between the stabilizer strut and the torque link being arranged to constrain their outer ends to rotate together about the steering axis, while permitting their inner ends to have relative movement either vertically or angularly, the inner end of the torque link being pivotally connected to the steerable element to permit angular movement in a vertical plane of the torque link with respect to the steerable element while constraining the latter to rotate about its axis in response to steering force exerted through the torque link, motor means connected between the non-steerable element and the stabilizer strut in such a manner that actuation of said means will cause a turning force to be exerted on said strut for steering said steerable element.

17. A fluid pressure operated steering device, for use on a vehicle having a non-steerable element and a steerable element connected to the non-steerable element, comprising a stabilizer strut, the inner end of which is connected to the non-steerable element in such a manner as to permit vertical and lateral angular movements of the outer portion of the stabilizer strut with respect to the non-steerable element, a torque link connected at its outer end to the end of the stabilizer strut, the connection between the stabilizer strut and the torque link being arranged to constrain their outer ends to rotate together about the steering axis, while permitting their inner ends to have relative movement either vertically or angularly, the inner end of the torque link being operatively connected to the steerable element to permit angular movement in a vertical plane of the torque link with respect to the steerable element while constraining the latter to rotate about its axis in response to steering force exerted through the torque link, motor means connected between the non-steerable element and the stabilizer strut in such a manner that actuation of said means will cause a turning force to be exerted on said strut for steering said steerable element.

18. A fluid pressure operated steering device, for use on a vehicle having a non-steerable element and a steerable element connected to the non-steerable element, comprising a stabilizer strut, the inner end of which is connected to the non-steerable element in such a manner as to permit vertical and lateral angular movements of the outer portion of the stabilizer strut with respect to the non-steerable element, a torque link connected at its outer end to the end of the stabilizer strut, the connection between the stabilizer strut and the torque link being arranged to constrain their outer ends to rotate together about the steering axis, while permitting their inner ends to have relative movement either vertically or angularly, the inner end of the torque link being operatively connected to the steerable element to permit angular movement in a vertical plane of the torque link with respect to the steerable element while constraining the latter to rotate about its axis in response to steering force exerted through the torque link, and a motor comprising two relatively reciprocable parts, one of which is connected to the non-steerable element at a point spaced laterally from one side of the inner end of the stabilizer strut, and the other of which is connected to the stabilizer strut near the outer end of the stabilizer strut.

19. A steerable aircraft landing gearing comprising two telescopically associated landing gear elements, a strut connected at one of its ends to one of said elements, a link connected between the other end of said strut and the other element, and motor means operatively connected to the end of said strut near the link connection and to the first mentioned element at a point spaced laterally from the first mentioned connection of said strut and said first mentioned element whereby actuation of said motor will exert a lateral turning force on said strut.

FRANKLIN C. ALBRIGHT.

REFERENCES CITED

The following references are of record in the file of this patent:

UNITED STATES PATENTS

| Number | Name | Date |
|---|---|---|
| 408,372 | Case | Aug. 6, 1889 |
| 2,057,089 | De Millar | Oct. 13, 1936 |
| 2,336,203 | Warner | Dec. 7, 1943 |
| 2,424,233 | Greenough | July 22, 1947 |

FOREIGN PATENTS

| Number | Country | Date |
|---|---|---|
| 345,294 | Great Britain | Mar. 13, 1931 |